United States Patent [19]

Jacoby

[11] 4,266,204
[45] May 5, 1981

[54] DELAY LINE SIGNAL EQUALIZER FOR MAGNETIC RECORDING SIGNAL DETECTION CIRCUITS

[75] Inventor: George V. Jacoby, Los Altos, Calif.
[73] Assignee: Sperry Rand Corporation, New York, N.Y.
[21] Appl. No.: 71,955
[22] Filed: Sep. 4, 1979
[51] Int. Cl.³ .............................................. H03H 11/06
[52] U.S. Cl. ................................. 333/28 R; 307/264; 330/151; 330/252
[58] Field of Search ...................... 333/28 R; 328/163; 330/151, 252; 375/11

[56] References Cited

U.S. PATENT DOCUMENTS

| 2,958,831 | 11/1960 | Clark | 333/28 R |
| 3,584,235 | 6/1971 | Fukui et al. | 328/163 X |
| 3,868,604 | 2/1975 | Tongue | 333/28 R |

Primary Examiner—Paul L. Gensler
Attorney, Agent, or Firm—Linval B. Castle; Eugene T. Battjer; William E. Cleaver

[57] ABSTRACT

A signal amplitude equalizer circuit, having linear phase, for reforming high density magnetically recorded read-back signals to remove peak shift and the resulting errors caused thereby. The equalizer circuit employs series balanced differential amplifier circuits in connection with properly terminated delay lines across the amplifier output terminals to provide an adjustable transfer function that transforms the readhead signal, that follows an exponential frequency spectra curve, into a cosine power frequency spectra curve which, in the time domain, possesses a sufficiently narrow base to eliminate peak shift and its resulting amplitude decay.

9 Claims, 8 Drawing Figures

DELAY LINE SIGNAL EQUALIZER FOR MAGNETIC RECORDING SIGNAL DETECTION CIRCUITS

BRIEF SUMMARY OF THE INVENTION

This invention relates to binary signal detection and more specifically to a novel, linear phase, signal amplitude equalizer using delay lines. The invention is useful for various signal detection applications and particularly for use in read circuitry for very high density magnetically recorded binary data.

Magnetic recording involves the application of electrical current changes in the windings of a transducer positioned adjacent a moving magnetic storage medium. These current changes are then more or less permanently stored in the medium in the form of polarization reversals of the magnetic dipoles forming the medium. Reading of the stored data is accomplished with a similar transducer which senses the magnetic dipole reversals and generates in its winding an e.m.f. corresponding to the amplitude and frequency of the reversals.

In the magnetic storage of binary data, the input recording signal is generally in the form of a square wave in which a rising edge of the waveform may turn the magnetic dipole in a first direction in the storage medium to indicate a binary "1", and the dropping edge of the waveform may reverse the dipole to indicate a binary "0". The pulse width and the frequency of the recording square wave will, of course, be varying according to the binary numbers to be recorded and the particular type of recording code being employed. Unfortunately, the signal read from the medium is not a square wave, one important reason being that the e.m.f. developed in the read transducer winding is proportional to the time derivative of the recorded magnetic reversals so that the binary data must be extracted by providing circuitry that will accurately measure the spacing between adjacent peaks and valleys in the transducer output signal. At relatively low frequencies, i.e., magnetic reversals per second, this is not a problem and many various circuits to accomplish this have been in use for many years.

In order to provide maximum data storage capability in a given magnetic medium, it is obviously advantageous to store more magnetic reversals per unit space. Many ingenious types of coding techniques have been devised and recording densities of many thousands of magnetic reversals are presently in use. At these high densities, the read transducer output signal bears very little resemblance to the original recording signal, and the necessary reconstruction of the detected signal so that the magnetically stored data may be accurately extracted requires complex electronic wave shaping techniques. For example, U.S. Pat. No. 4,081,756 issued to Price et al and assigned to the assignee of the present invention, discloses dual channel signal detection circuitry in which the distorted read head signal is first equalized to remove amplitude deterioration and peak shifting effects caused by the crowding of closely adjacent pulses and then is applied into parallel channels for peak location detection and for amplitude detection, the outputs of which are gated together to produce the required output data.

As will be discussed later in greater detail, equalization of the read head signal is required when signal peaks become crowded together as a result of very high density recording. When such pulse crowding occurs, distortion of the read signal waveform results because the voltage peaks induced into the transducer by magnetic dipole reversals tend to combine and result in a transducer output signal in which these pulses not only display a reduction in amplitude, but are also forced apart. This increased spacing results, without equalization, in inaccurate peak detection and a consequent erroneous data output from the detection circuitry.

The most effective equalization circuitry operates to narrow the individual pulses from the transducer without amplitude change and without shifting the positions of the pulse peaks. These narrowed pulses can then be spaced closer together without the mutual interaction that produces the peak shift and amplitude decay.

As disclosed in the above-referenced U.S. pat. No. 4,081,756, a preferred equalization method of operating on an input pulse to produce the required narrower non-interacting pulses involves the process steps of determining the Fourier transform of the unequalized transducer output pulses, determining the Fourier transform of the desired or optimum narrowed non-interacting pulses, determining the function that describes the ratio between the two functions, and then developing circuitry that provides that determined function. In the referenced patent it is found that equalization circuitry that would operate on the unequalized pulses and would output the desired narrowed non-interfering pulses included, in each of the two input conductor legs, a delay line driving an emitter follower circuit having its output coupled through a potentiometer to the opposite input conductor. The arms of both potentiometers were connected to a difference amplifier, the output of which was applied through a low pass filter to the equalizer output. This equalizer circuitry operates exceptionally well in narrowing transducer read pulses without reducing peak amplitudes so that very high bit rates may be read without pulse peaks shifts due to the interaction between adjacent pulses. However, the delay lines are coupled into amplifiers having an infinitely high input impedance. This results in unterminated delay lines having very large reflected signals; however, this is required to obtain the necessary transfer characteristics employed in this prior art invention. For proper operation, these reflected signals require perfect alignment with the forward pulses; that is, it is necessary that the reflected signals be of the same amplitude and phase as the forward pulses. This, of course, present practical problems since there are many factors, such as circuit board capacitances, that disturb the very tenuous balances and seriously distort the output pulse form of the equalizer circuit.

The present invention is for an equalizer circuit that performs substantially the same function as the above-discussed prior art circuit but which not only eliminates the possibility of output distortion, but also can be easily adjusted by varying a potentiometer setting to alter the widths of the output pulses. The equalizer circuitry of the invention employs balanced differential amplifier circuits in double ended input-output configurations with delay lines terminated in their characteristic impedances so that no reflections occur, thereby eliminating the prior art amplitude and phase alignment problems and the distortion that often originates from unbalanced amplifier arrangements.

DETAILED DESCRIPTION OF THE PREFERRED EMBODIMENT

Figure 1:
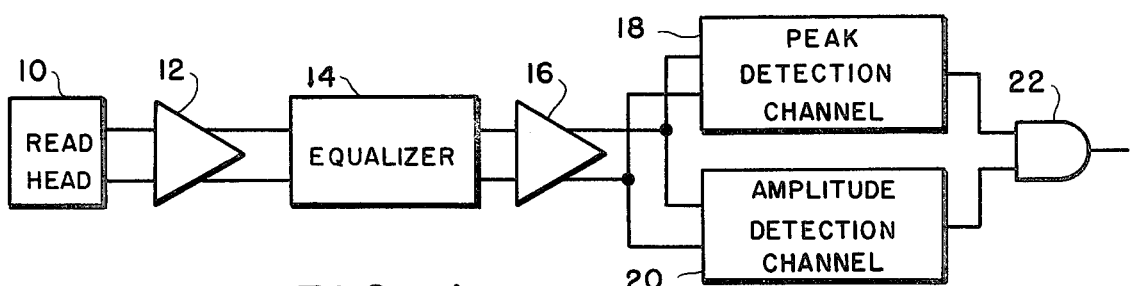
FIG. 1 is a block diagram of a typical signal detector circuit illustrating the location of the equalizer circuit of the invention.

Illustrated in FIG. 1 is a block diagram of the preferred signal detector circuit incorporating the novel equalizer circuitry of the invention. The illustrated detector circuit is identical in overall operation with that illustrated in the aforementioned price et al U.S. No. 4,081,756, and includes a read head 10 which, in operation is positioned adjacent a moving magnetic medium to sense the polarity reversals therein and to generate an output signal of corresponding pulse reversals. The output of the read head 10 is first applied to a preamplifier 12 and thence to the equalizer circuitry 14 of the invention. Equalizer circuitry 14 operates to narrow the widths of the individual pulses so that they do not mutually interact to produce peak shift and amplitude deterioration. The equalized pulses are then applied through an automatic gain control circuit 16 to a peak detection channel 18 and an amplitude detection channel 20 in parallel therewith. The peak detection channel 18 includes a differentiator, a detector, and a delay element which function to provide data pulses that are coincident in time with the data peaks of the read signal supplied from the read head 10. The amplitude detection channel 20 normally includes a gate generator which serves to provide gating pulses for precluding errors which otherwise may occur due to the presence of noise in the base line sections of the read signal. Gating pulses provided by the amplitude detection channel 20 are then applied, along with the data pulses from the output of the peak detection channel 18, to AND-gate 22 which responds to the applied pulses to produce gated data pulses representative of the transitions recorded on the storage medium associated with the read head 10.

Operation of a gate generator as an amplitude threshold device in the amplitude detection channel 20 is made possible because the equalizer 14 operates on the signal applied at its input to produce output pulses of constant amplitude and peak spacing that have been corrected for peak shift, as will be subsequently explained.

Figure 2:
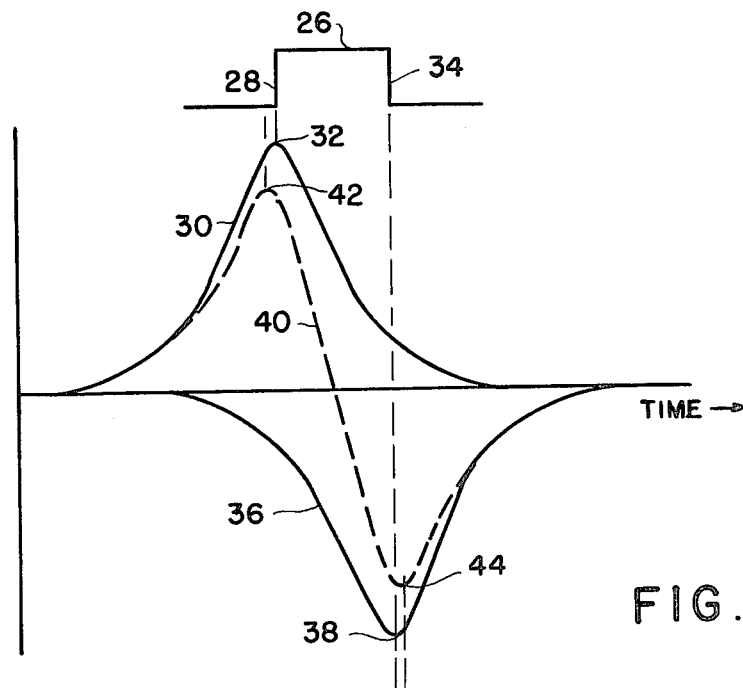
FIG. 2 are waveform diagrams of typical unequalized readback pulses illustrating pulse interaction resulting in peak shift.

FIG. 2 is a waveform diagram illustrating peak shift caused by pulse crowding that results when read pulses are received at a high frequency or from a medium having a very high packing density. If the data on the magnetic medium is written with the transducer writing current that follows the square wave 26, an isolated rising or leading edge 28, when sensed by a read transducer, would appear as the curve 30 and rise to a peak 32 corresponding to the leading edge 28 and would thereafter decay back to its zero level. Similarly, an isolated falling or lagging edge 34 of the square wave 26 would appear as the curve 36 with the peak 38 corresponding to the edge 34. However, when the edges 28 and 34 of the square wave appear very close together because of high recorded bit densities, the resulting read signal pulses 30 and 36 mutually interact and the result is an output waveform 40, illustrated by dashed lines, that is the algebraic sum of the individual isolated pulses 30 and 36. As illustrated in FIG. 2, the peak 42 of the waveform 40 has been reduced in amplitude and has been displaced in time to the left of the desired peak 32. Similarly, the peak 44 is displaced to the right of the desired peak 38. The spacing between peaks 32 and 42 added to the spacings between peaks 38 and 44 is the total peak shift resulting from the closely spaced read signal reversals. Since accurate readout depends on the precise position of the signal peaks, the output pulse 40 may produce output errors.

Figure 3:
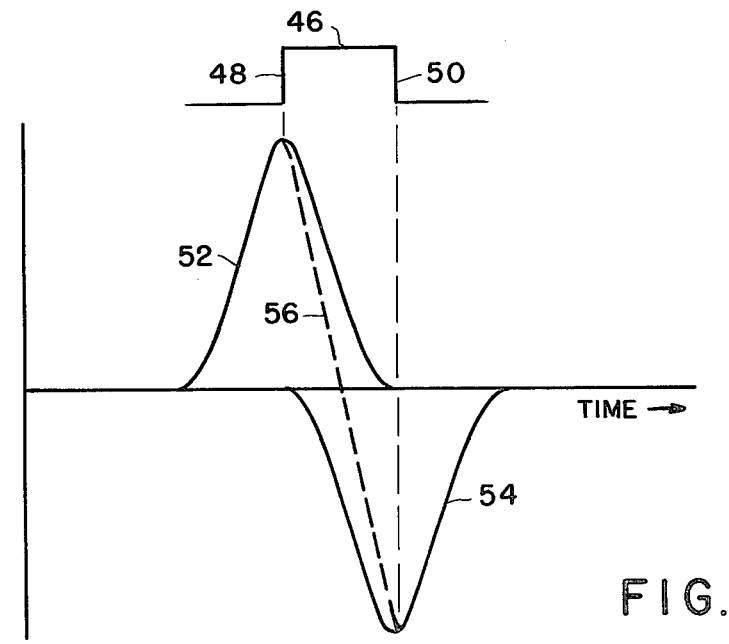
FIG. 3 is a waveform diagram of equalized readback pulses illustrating the absence of peak shift.

FIG. 3 is a similar waveform diagram illustrating a recorded square wave signal 46 having a leading or rising edge 48 and a lagging edge 50. The individual isolated waveforms 52 and 54 of the read circuitry follow the leading edge 48 and lagging edge 50, respectively, of the square wave 46. However, the individual isolated waveforms 52 and 54 differ from the waveforms 30 and 36 of FIG. 2 in that the pulses 52, 54 of FIG. 3 are much narrower. As illustrated in FIG. 3, pulse 52 drops to its zero level before pulse 54 of opposite polarity reaches it peak. The resulting output pulse 56, illustrated by the dashed line, has peaks corresponding to the peak positions of the pulses 52 and 54 and is of corresponding peak amplitudes. Therefore, the output pulse 56 of FIG. 3 displays no peak shift or amplitude decay and magnetic read circuitry which generates data according to the precise position of the signal peaks will properly respond to the waveform 56 and reproduce accurate readout data.

It is the function of the equalizer 14 of FIG. 1 to operate on the signal detected by the read head 10 typically illustrated as pulse 40 in FIG. 2, to develop a precisely peak-positioned pulse such as illustrated by waveform 56 of FIG. 3.

The process for developing the equalizer of the invention includes the steps of analyzing the unequalized readback pulse, deriving an equalizer equation which, when applied to the unequalized pulses, will produce the desired narrow-based pulses, and then designing an equalizer circuit that will follow the derived equation. To analyze the readback pulse it is necessary to perform a Fourier transformation and to plot a curve of the amplitudes of the spectrum of the unequalized pulse. It can be shown that an unequalized readback pulse is a Lorentzian curve in the time domain and has the Fourier transform:

$$C(f) = e^{-\pi T_{50} f}$$

where $T_{50}$ is the time duration at the half amplitude points in the pulse. If the read channel is considered a communication channel, it can be shown that a preferred isolated pulse shape is one that exhibits a Fourier transform:

$$E(f) = \cos^2 \pi f / 2f_c$$

or $$E(f) = \cos^4 \pi f / 2f_c$$

where $f_c$ is the system band width, or cut-off frequency. Both cosine power equalizer functions will effectively narrow the pulse to eliminate peak shifts with the cosine-squared function providing the narrowest pulse but one that has oscillatory tails as will be discussed later.

Figure 4:
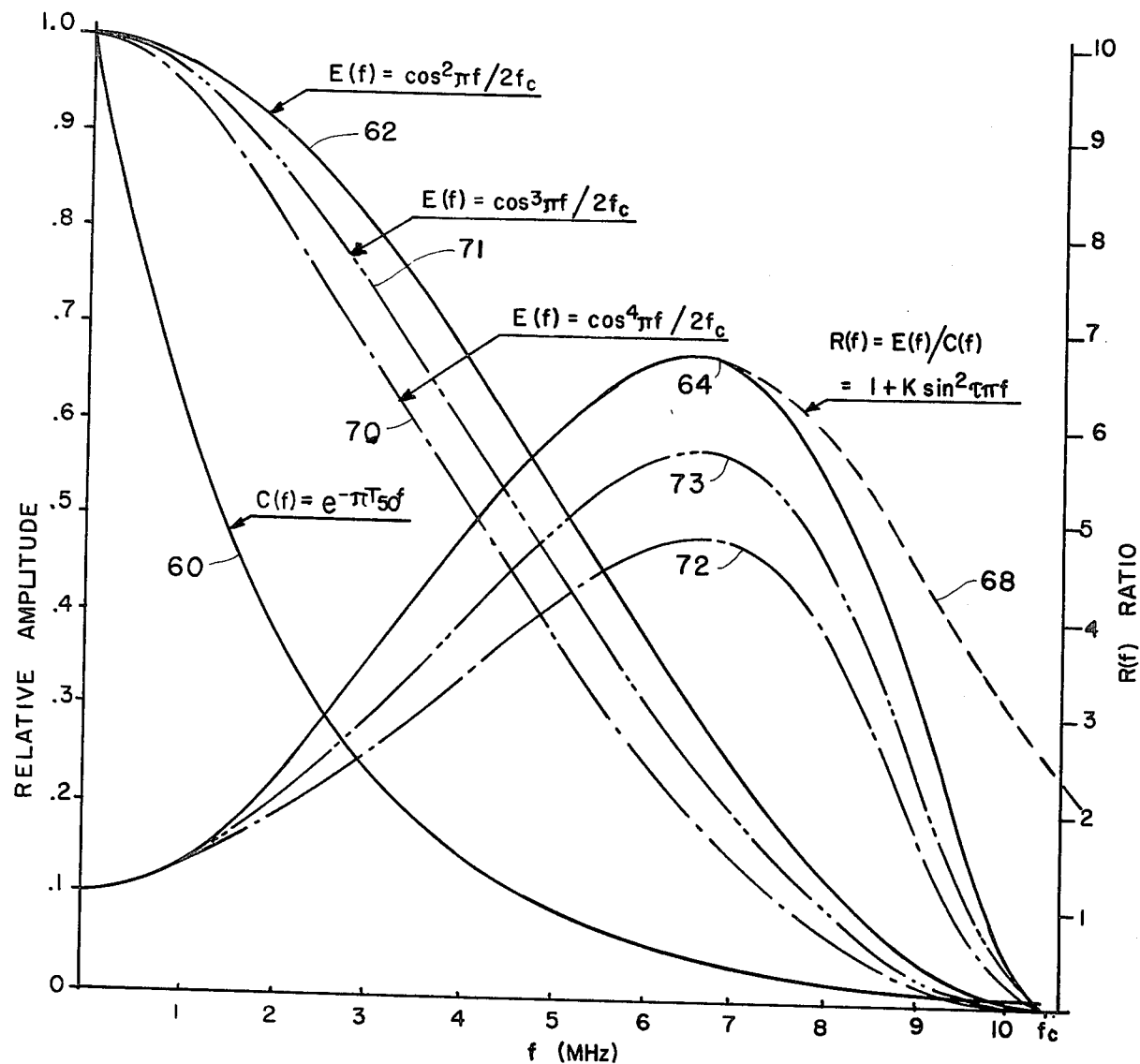
FIG. 4 is a graph illustrating the plots of amplitudes in the frequency domain of the unequalized waveform of FIG. 2, equalized waveforms of FIG. 3, and correction curves necessary to achieve the equalization.

Illustrated in FIG. 4 are solid line curves of the unequalized readback pulse 60, or C(f), the equalized pulse 62, or E(f) representing the cosine-squared function and the required equalizer transfer function curve 64, or R(f), which is the numerical ratio of E(f)/C(f). Amplitudes of E(f) and C(f) functions are read on the left-hand scale. Since the values of C(f) and E(f) are known, this ratio provides the necessary data for plotting the curve 64, which is read on the scale at the right in FIG. 4. Therefore, to convert an unequalized readhead output pulse into a narrowed equalized pulse, it is necessary only to apply the readhead pulse through an equalizer circuit that follows the transfer function curve 64 of FIG. 4.

By numercial analysis, it can be determined that the desired equalizer function R(f), shown by the curve 64, can be represented mathematically to a very close approximation by the equation:

$$R(f) = (1 + K \sin^2 \tau \pi f) \cdot B(f)$$

where, in FIG. 4, R(f) is the function following curve 64, $\tau$ is a delay which will be subsequently discussed, f represents the frequency, K is a constant, and B(f) is a transfer function of a low pass filter. This function is preferably provided by a linear phase low pass filter having a flat response up to the approximate frequency of the peak of curve 64 and dropping beyond, for reducing the high frequency amplitudes of the transfer function curve 64 from the normal path represented by the dashed line 68 to the desired high frequency response having a cutoff frequency in the order of 10.5 MHz as illustrated.

Also illustrated in chain lines in FIG. 4 are curves 70 and 72, respectively representing E(f) equal to the cosine-fourth function and R(f), its corresponding equalizer transfer function. The equalizer transfer function curve 72 is seen to be somewhat similar to curve 64 and can be shown to follow the identical equation R(f), but with a different value for K. Plotted between the cosine-squared function curves 62, 64 and the cosine-fourth function curves 70, 72 are cosine-cubed function curves 71, 73, respectively representing E(f) and R(f) for that cosine power.

Now, having determined that an equalizer with a sine-squared type of transfer function will convert the readhead output pulse with its exponential frequency spectrum into a narrow based pulse signal free of peak shift errors and with amplitudes corresponding to the readhead signal amplitudes, it is necessary to design the equalizer circuitry.

The previously discussed U.S. Pat. No. 4,081,756, describes a balanced equalizer circuit for converting the read signal into pulses having a cosine-fourth frequency spectrum. This prior art balanced equalizer includes open ended delay line circuits and relies upon the large resulting signal reflections to obtain the desired cosine power transfer function. As previously discussed, the success of this prior art system depends upon a very delicate balance; the desired reflected signals from the unterminated delay lines must be precisely matched with the forward signals. Stray circuit board capacitances and other conditions will readily unbalance the system to produce distorted equalization. The balanced equalizer circuitry of the present invention employs the previously described sine-squared transfer function. It also employs delay lines but lines which are terminated in their characteristic impedances and which are coupled across the output terminals of wide band differential amplifiers to maintain balanced signal paths which are not unbalanced by unforeseen conditions or stray circuit capacities.

Figure 5:
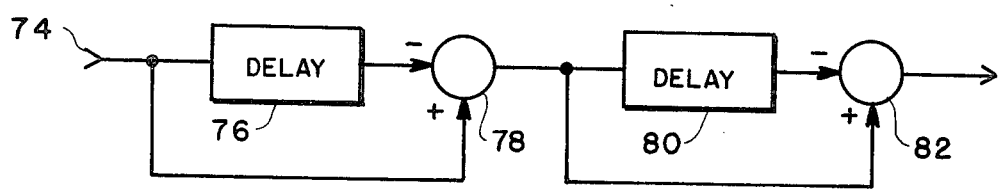
FIG. 5 is a circuit block diagram presented to illustrate the equalization principle of the invention.

FIG. 5 is a block diagram illustrating two identical series connected delay line circuits. If an input voltage signal is applied to the input terminal 74, and through the delay line 76, of $\tau$ seconds, to the negative input terminal of a differential point 78, the input signal applied directly to the positive input terminal of the differential point 78 will produce a ratio of signal output to signal input:

$$eo/ei = 1 - e^{-\tau S}$$

where the term S is the product of the operator j and $2\pi f$, and the term e is the base value of the natural logarithm.

If the output of the differential point 78 is applied through an identical delay circuit including the delay line 80 and differential point 82, the output to input ratio becomes:

$$\frac{eo}{ei} = (1 - e^{-\tau S})^2$$
$$= [(2j \sin \tau \pi f)(e^{-j\tau \pi f})]^2$$
$$= (-4 \sin^2 \tau \pi f) \cdot e^{-j2\pi f}$$

Therefore, the resultant amplitude response of the circuit is proportional to the desired sine-squared function. The second term of the equation indicates the constant delay or linear phase.

Referring again to FIG. 4, a sine-squared response produced by the two series delay line differentiators would become zero at zero frequency, and would thus deviate from the desired response to lower frequencies. To make the actual response fit perfectly the desired response curve 64, it is necessary to introduce the signal itself and add it to the sine-squared response and also reduce the response by a low pass filter at the high frequencies as previously discussed.

Figure 6:
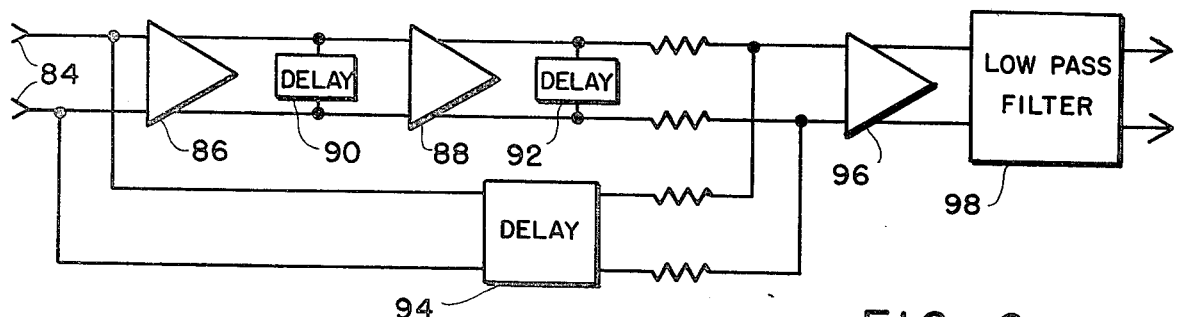
FIG. 6 is a circuit block diagram illustrating further development of the circuitry of FIG. 5.

The resulting equalizer function then becomes:

$$(1 + K \sin^2 \tau \pi f)(e^{-2\pi f j \tau}) \cdot B(f)$$

and the circuitry illustrated in the block diagram of FIG. 6 will perform this function.

In FIG. 6, an input signal at the input terminals 84 is applied to a differential amplifier 86, the output of which is applied to a second differential amplifier 88. A delay line 90 having a delay of $\tau$ seconds is coupled across the output terminals of the amplifier 86 and an identical delay line 92 is coupled across the output terminals of the differential amplifier 88. These series connected amplifier-delay line circuits are functionally equivalent to the circuitry illustrated in the block diagram of FIG. 5 and represent the sine-squared path of the equalizer circuit. This sine-squared path is connected in parallel with a direct path containing a single delay line 94 of identical delay. The values of the direct path and the sine-squared path are added together in a summing amplifier 96 and the output is applied through a linear phase low pass filter 98, as previously described. The ratio of output signal to input signal in the circuitry of FIG. 6 will therefore precisely follow the desired curve 64 of FIG. 4 and provide the necessary equalization function.

Figure 7:
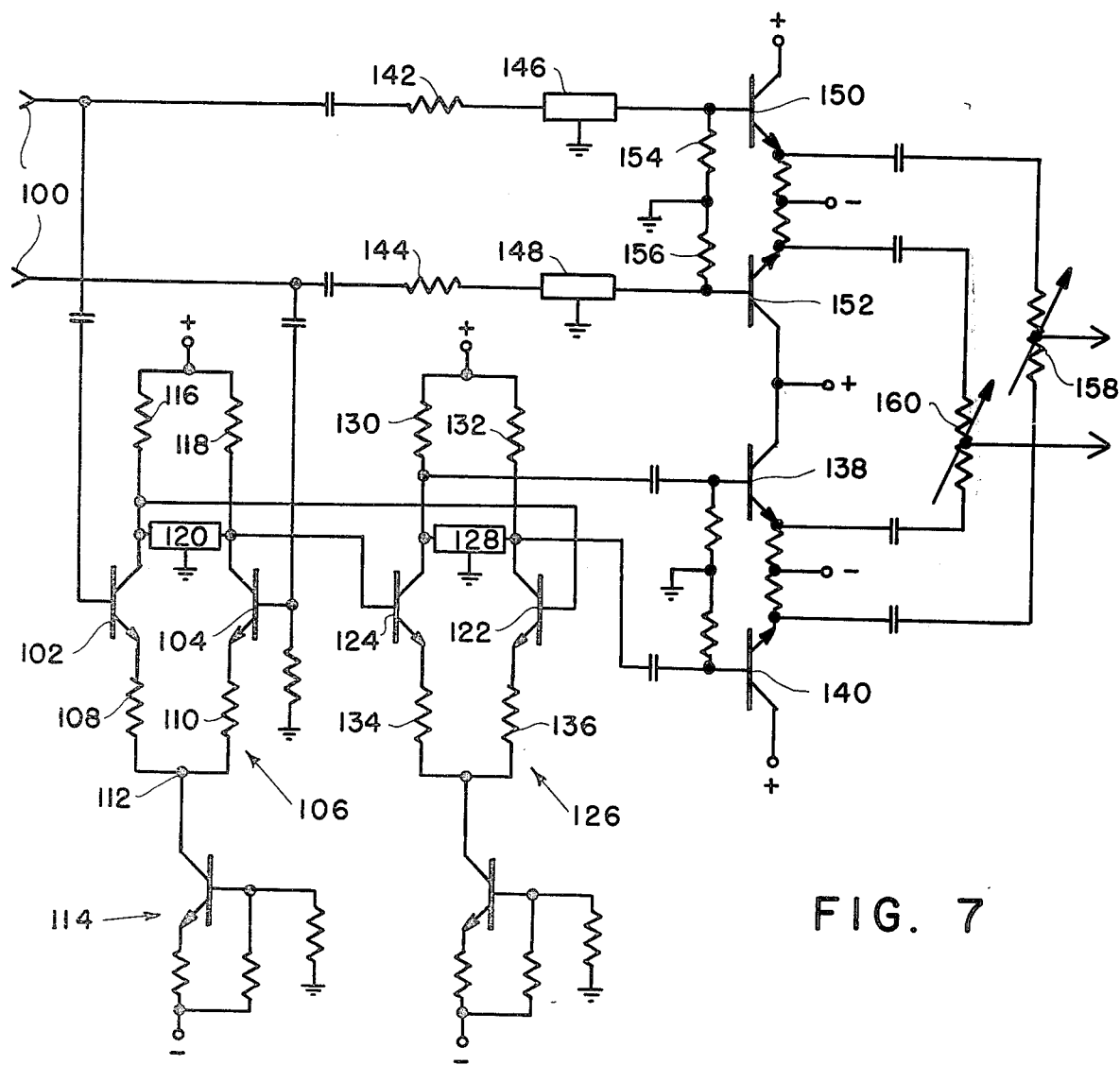
FIG. 7 is a schematic circuit diagram of a preferred embodiment of the equalizer of the invention.

FIG. 7 is a schematic diagram of the circuitry of the block diagram of FIG. 6. In this preferred embodiment, the signal is introduced into the circuitry of FIG. 7 at input terminals 100 and is applied to the base elements of transistors 102 and 104 of the differential amplifier 106. The emitters of transistors 102 and 104 are coupled through equal value resistors 108 and 110, respectively, to a common point 112 which is connected through a constant current source 114 to a suitable negative potential source. The collectors of transistors 102 and 104 are coupled through equal resistors 116 and 118, respectively, to a positive voltage source. Coupled between the collectors of transistors 102 and 104 is a delay line 120. The collector resistors 116 and 118 have values equal to the delay line characteristic impedance to thereby properly terminate the delay line 120.

The output signal is taken from the collectors of transistors 102 and 104 and is applied to the bases of transistors 122 and 124, respectively, in a second differential amplifier 126. Amplifier 126 may be identical to amplifier 106 and has a delay line 128 terminated in equal value collector resistances 130 and 132, which have values equal to the characteristic impedance of the delay line.

The output signal is taken from the collectors of the transistors 122 and 124 and is applied through suitable coupling capacitors to a summing amplifier comprising a pair of transistors 138 and 140 connected in an emitter follower configuration.

The circuitry input terminals 100 are also connected through suitable coupling capacitors and through equal value resistors 142 and 144 to delay lines 146 and 148, respectively. This path through delay lines 146 and 148 is referred to as the direct path through delay line 94 of FIG. 6. Delay lines 146 and 148 are terminated in their characteristic impedances at both ends. The outputs of delay lines 146 and 148 are applied to the base electrodes of transistors 150 and 152 which comprise an additional portion of the summing amplifier 96 of FIG. 6. The base electrodes of transistors 150 and 152 are connected to ground through resistors 154 and 156, respectively, to provide a characteristic impedance termination for the delay lines 146 and 148. The collectors of transistors 150 and 152 are connected to a positive voltage source and the emitters are connected through suitable equal resistors to a negative potential source. Transistors 150 and 152 are connected in an emitter follower configuration and the emitter of transistor 150 is coupled to the emitter of transistor 140 through a variable center tapped resistance 158. Similarly, the emitter of transistor 152 is coupled to the emitter 138 through an identical variable center tapped resistance 160. The direct path transistors 150 and 152 and the sine-squared path transistors 138 and 140 together with the summing resistors 158 and 160 form the summing amplifier 96 referred to in FIG. 6. The output of the circuitry is taken from the center taps of resistors 158 and 160 and is thereafter applied through the low pass filter 98 illustrated in FIG. 6 but omitted from FIG. 7.

Figure 8:
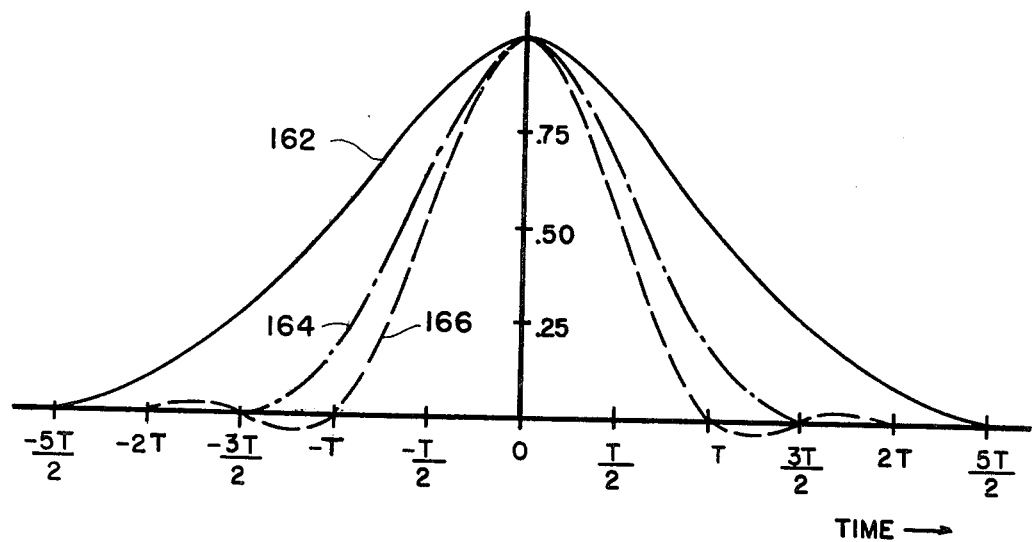
FIG. 8 is a waveform diagram illustrating amplitude time comparisons between a typical unequalized pulse and various equalized pulses.

Resistors 158 and 160 function to vary the value of "K" in the previously discussed sine-squared equation. Varying the values of resistors 158 and 160, effectively changes the transfer function of the equalizer circuit to alter the desired spectrum of the equalized pulse, E(f), of FIG. 4 between the cosine power functions. That is, the E(f) curve 62 representing a cosine-squared spectral function in FIG. 4, may be varied by adjustment of the resistors 158 and 160 to either a cosine-cubed or a cosine-fourth spectral function as represented by the curves 71 or 70 of FIG. 4. FIG. 8 illustrates the effects of such a variation in the value of the "K" factor.

Illustrated in FIG. 8 are three typical pulse waveforms plotted as amplitude versus time. The waveform 162 is a typical unequalized readhead pulse, such as represented by the C(f) line 60 in the exponential curve plotted in the frequency domain of FIG. 4. The curve 164, shown as a chain line, represents the waveform of a typical readhead signal after being equalized with circuitry following a cosine-fourth spectral function as described in the aforementioned U.S. Pat. No. 4,081,756. The curve 166, shown as a dashed line, illustrates a typical equalized readhead pulse after passing through circuitry following a cosine-squared spectral function as previously discussed herein. It will be noted that the cosine-fourth waveform 164 drops to a zero amplitude level at 3T/2, where T is 1/cutoff frequency. In many applications, this provides a very adequate equalization. However, if the signal waveform must be further narrowed in order to eliminate pulse peak shift, it may be advantageous to adjust the variable resistors 158 and 160 of FIG. 7 to obtain the cosine-squared response curve 166 of FIG. 8. It will be noted that the waveform represented by curve 166 has a base that is one-third narrower than the curve 164, and intersects the base line at points equal to the value T. The narrower based waveform 166 is shown with a ringing tail that dips below the zero amplitude line and oscillates at a decaying amplitude frequency of 1/T. If such oscillating ringing tails are objectionable, it may be necessary to employ means outside the scope of this disclosure for eliminating the effects of the ringing. To eliminate confusion in FIG. 8, the cosine-cubed response curve has been omitted but would be located approximately midway between curves 164 and 166 and intersect the zero amplitude level at ±5T/4 points.

While the preferred embodiment of the equalizer follows a sine-squared transfer function, it should be pointed out that the delay line values of FIGS. 6 and 7 need not be equal. That is, the delay of line 90 of FIG. 6 may be represented by $\tau$, and that of line 92 by $\tau_2$ so that the sine-squared path of FIG. 6 may actually be (sin $\tau_1 \pi f$) (sin $\tau_2 \pi f$). The product of these different argument sine functions is then summed with the input signal that has been delayed to assure that it is in phase with the sine product to produce the transfer function:

$$1 + K(\sin \tau_1 \pi f)(\sin \tau_2 \pi f)$$

If the sine product equals the sine-squared function of the preferred embodiment, the transfer function curve 64 of FIG. 4 will be unchanged. If the product is not equal there may be some horizontal shift in the curve.

What is claimed is:

1. A signal amplitude equalizer for reforming an input signal of sequences of data pulses of variable peak amplitudes into an output signal of sequences of symmetrical equal-amplitude data pulses, said equalizer having a transfer function in the frequency domain that is proportional to the value: $1 + K \sin^2 \tau \pi f$, where f is the frequency, $\tau$ is a time delay, and K is a constant that is alterable to correspondingly alter the zero-amplitude width of each data pulse in said output signal sequences, said equalizer including:

first and second delay line circuitry coupled in series and to the input terminals of said equalizer;

each of said first and said second circuitry including a delay line having a delay of $\tau$ and each delay line being terminated in its characteristic impedance, each of said first and said second delay line circuitry executing the function, $K \sin \tau \pi f$; and circuitry means including third delay line circuitry for adding the signal at said input terminals to the signal produced from said first and second series delay line circuits.

2. The equalizer claimed in claim 1 including first and second parallel circuitry coupled between said equalizer input terminals and a summing amplifier, said first circuitry performing the sine-squared transfer function and comprising first and second differential amplifiers in series, said first and second delay lines being respectively coupled across the output terminals of said first and second amplifiers.

3. The equalizer claimed in claim 2 wherein said second parallel circuitry includes said third delay line circuitry, the delay line in said circuitry having a delay of $\tau$ seconds, said delay line being terminated in its characteristic impedance.

4. The equalizer claimed in claim 2 wherein the signal outputs of said first and second parallel circuits are combined in said summing amplifier, said summing amplifier having a variable resistance, the adjustment of which correspondingly alters the value of the constant, K.

5. The equalizer claimed in claim 2 wherein said first and second parallel circuits are respectively coupled to first and second emitter follower circuits in said summing amplifier, the output terminals of said first and second emitter follower circuits being respectively coupled to first and second ends of a variable resistance, the adjustment of which correspondingly varies the value of the constant, K.

6. The equalizer claimed in claims 2, 4 or 5 further including a low pass linear filter coupled to the output of said summing amplifier, said filter reducing the high frequency amplitudes of the equalizer transfer function to zero amplitude at a predetermined circuitry cutoff frequency.

7. A signal amplitude equalizer for reforming an input signal of sequences of data pulses of variable peak amplitudes into an output signal of sequences of symmetrical equal amplitude data pulses, said equalizer having a transfer function in the frequency domain that is proportional to the value: $1 + K (\sin \tau_1 \pi f)(\sin \tau_2 \pi f)$ where f is the frequency, K is a constant alterable to correspondingly alter the zero-amplitude width of each data pulse in said output signal sequence, said equalizer including first and second delay line circuitry coupled in series and to the input terminal of said equalizer; said first and said second delay line circuitry respectively including first and second delay lines, each terminated in its characteristic impedance, and having respective time delays of $\tau_1$ and $\tau_2$; and circuitry means including third delay line circuitry coupled between the input of said equalizer and the output of said series first and second delay line circuits for summing said input signal, in phase, with the sine function product generated by said series first and second delay line circuits.

8. The equalizer claimed in claim 7 wherein said first and second time delays, $\tau_1$ and $\tau_2$ are unequal.

9. The equalizer claimed in claim 7 wherein said first and second time delays $\tau_1$ and $\tau_2$ are equal.

* * * * *